United States Patent
Teodosiu et al.

(10) Patent No.: US 7,660,833 B2
(45) Date of Patent: Feb. 9, 2010

(54) GRANULAR CONTROL OVER THE AUTHORITY OF REPLICATED INFORMATION VIA FENCING AND UNFENCING

(75) Inventors: Dan Teodosiu, Bellevue, WA (US); Nikolaj S. Bjorner, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 289 days.

(21) Appl. No.: 10/733,459

(22) Filed: Dec. 10, 2003

(65) Prior Publication Data

US 2005/0015413 A1  Jan. 20, 2005

Related U.S. Application Data

(60) Provisional application No. 60/486,627, filed on Jul. 10, 2003.

(51) Int. Cl.
*G06F 12/00* (2006.01)
(52) U.S. Cl. .................................................. 707/203
(58) Field of Classification Search ................ 707/100, 707/203, 204, 201, 202; 709/220, 206, 217, 709/218, 219, 236, 237; 714/6, 7, 19, 24
See application file for complete search history.

(56) References Cited

U.S. PATENT DOCUMENTS

| 5,486,826 | A |   | 1/1996  | Remillard |   |
|---|---|---|---|---|---|
| 5,765,171 | A |   | 6/1998  | Gehani et al. |   |
| 5,787,247 | A | * | 7/1998  | Norin et al. ............... | 709/220 |
| 5,787,262 | A | * | 7/1998  | Shakib et al. .............. | 709/205 |
| 5,806,074 | A | * | 9/1998  | Souder et al. .............. | 707/201 |
| 5,832,514 | A | * | 11/1998 | Norin et al. ............... | 707/202 |
| 6,341,291 | B1 | * | 1/2002 | Bentley et al. ............. | 707/203 |
| 6,412,017 | B1 |   | 6/2002 | Straube |   |
| 6,938,084 | B2 | * | 8/2005 | Gamache et al. ............ | 709/226 |
| 7,035,847 | B2 |   | 4/2006 | Brown |   |
| 2002/0099728 | A1 | * | 7/2002 | Lees et al. .................. | 707/203 |
| 2003/0005342 | A1 | * | 1/2003 | Thomas et al. ............. | 713/400 |

(Continued)

FOREIGN PATENT DOCUMENTS

EP   0 661 652   5/1995

(Continued)

OTHER PUBLICATIONS

Anonymous, International Search Report in Corresponding EP Application No. EP 04 10 2757.

(Continued)

*Primary Examiner*—Cheyne D Ly
(74) *Attorney, Agent, or Firm*—Merchant & Gould P.C.

(57) ABSTRACT

A method and system for controlling which content gets precedence and is replicated. A replica set is comprised of a set of resources. Each resource is associated with resource data and resource meta-data. For files-based systems, resource data includes file contents and attributes, while resource meta-data includes additional attributes that are relevant for negotiating synchronization during replication. An extra field called a "fence value" is added to the meta-data associated with each resource. During synchronization, first fence values are compared. The resource with the highest fence value includes the content that is controlling and replicated. If fence values are equal (and greater than a particular value), the controlling resource is determined based on other meta-data.

28 Claims, 7 Drawing Sheets

U.S. PATENT DOCUMENTS

| | | | |
|---|---|---|---|
| 2003/0079100 A1* | 4/2003 | Williams et al. | 711/165 |
| 2003/0182319 A1* | 9/2003 | Morrison | 707/200 |
| 2003/0187947 A1 | 10/2003 | Lubbers | |
| 2004/0024795 A1* | 2/2004 | Hind et al. | 707/204 |
| 2004/0068523 A1 | 4/2004 | Keith | |
| 2004/0111390 A1 | 6/2004 | Saito | |
| 2004/0133652 A1* | 7/2004 | Miloushev et al. | 709/214 |
| 2004/0177100 A1 | 9/2004 | Bjorner | |
| 2004/0181558 A1* | 9/2004 | Williams et al. | 707/200 |
| 2004/0186916 A1 | 9/2004 | Bjorner | |
| 2005/0015413 A1 | 1/2005 | Teodosiu et al. | |
| 2005/0099963 A1 | 5/2005 | Multer | |
| 2005/0125621 A1 | 6/2005 | Shah | |
| 2006/0031188 A1 | 2/2006 | Lara | |
| 2007/0168516 A1 | 7/2007 | Liu et al. | |

FOREIGN PATENT DOCUMENTS

| | | |
|---|---|---|
| EP | 1 160 682 A1 | 5/2001 |

OTHER PUBLICATIONS

"Oracle8i—Replication Management API Reference -Release 2 (8.1.6)" Oracle, 'Online! Dec. 1999, XP002307254.

"Oracle8i Replication—Release 8.1.5" 'Online! Feb. 1999, XP002307255.

Grönvall, Björn; Westerlund, Assar; Pink, Stephen; "The Design of a Multicast-based Distributed File," 1999, [26 pages].

Welch, Terry A., "A Technique for High-Performance Data Compression," IEEE, Jun. 1984, pp. 8-19.

Eshghi, Kave. Intrinsic References in Distributed Systems. Proceedings of the 22$^{nd}$ International Conference on Distribued Computing Systems Workshops (ICDCSW'02), Jul. 2-5, 2002, Vienna, Proceedings.

Hare, Van Court, Jr., Editor, "A Special Report on the SIGBDP Forum" *The New Data Base Task Group Report*, Atlantic City, NJ, May 17, 1971, vol. 3, No. 3, Special Issue, 1971.

The Workings of the CODASYL, Database Task Group Report, ACM, New York 1971 (No Document).

Birrell et al. The Echo Distributed File System. Digital Systems Rearch Center, Sep. 10, 1993, pp. 1-22.

Broder, Andrei Z. On the Resemblance and Containment of Documents. Proceedings of Compression and Complexity of Sequences, Jun. 11-13, 1997, pp. 21-29.

Burns, Randal C. and Long, Darrel D.E. Efficient Distributed Backup with Delta Compression. IOPADS, 1997, pp. 1-11.

Chien, S. and Gratch, J. Producing Satisfactory Solutions to Scheduling Problems: An Iterative Constraint Relaxation Approach. BEACON eSpace Jet Propulsion Laboratory, Jun. 13, 1994, pp. 1-6.

Eshghi, Kave. Intrinsic References in Distributed Systems. Software Technology Laboratory, HP Klaboratories Palo Also, HPL-2002-32, Feb. 7, 2002, pp. 1-8.

Fisher, Doug. Iterative Optimization and Simplification of Hierarchical Clusterings. Journal of Artificial Intelligence Research 4, Apr. 1996, pp. 147-179.

Kumar, Puneet and Satyanarayanan M. Flexible and Safe Resolution of File Conflicts. USENIX Winter 1995 Technical Conference on Unix and Advanced Computing Systems, Jan. 16-20, 1995, pp. 1-15.

Manber, Udi. Finding Similar Files in a Large File System. USENIX Winter 1994 Technical Conference, Oct. 1993, pp. 1-11.

Merrells, John et al. LDAP Replication Architecture. IETF Draft, Aug. 5, 1998, pp. 1-31.

Miyashita, Kazuo and Sycara, Katia. Improving System Performance in Case-Based Iterative Optimization through Knowledge Filtering. Proceedings of the International Joint Conference on Artificial Intelligence; 1995; pp. 371-376.

Petersen, Karin et al. Bayou: Replicated Database Services for World-wide Applications. Proceedings of the 7th SIGOPS European Workshop, Connemara, Ireland; Sep. 1996, pp. 275-280.

Petersen, Karin et al. Flexible Update Propagation for Weakly Consistent Replication. Proceedings of the 16th ACM Symposium on Operating Systems Principles (SOSP -16), Saint Malo, France; Oct. 1997; pp. 288-301.

Plan 9 Bell Labs [online]. Wikipedia, [Retrieved on Mar. 3, 2007], pp. 1-8. Retrieved from: http://en.wikipedia.org/wiki/Plan__9__from__Bell__Labs.

Popek, Gerald J. et al. Replication in Ficus Distributed File Systems. Proceedings of the Workshop on Management of Replicated Data; Nov. 1990; pp. 20-25.

Schmnuck, Frank and Haskin, Roger. GPFS: A Shared-Disk File System for Large Computing Clusters. Proceedings of the Conference on File and Storage Technologies (FAST'02); Jan. 28-30, 2002; pp. 231-244.

Teodosiu, Dan et al. Optimizing File Replication over Limited -Bandwidth Networks using Remote Differential Compression. MSR -TR-2006-157; Nov. 1996; pp. 1-16.

Davies, C. T., Jr., *Data Processing Spheres of Control*, IBM Systems Journal 17(2): 179-198 (1978).

Hare, Van Court, Jr., Editor, "A Special Report on the SIGBDP Forum" *The New Data Base Task Group Report*, Atlantic City, NJ, May 17, 1971, vol. 3, No. 3, Special Issue, 1971, The workings of the CODASYL, Database Task Group Report, ACM, New York 1971. (Trustee Innovation Report Review Nov. 2006-Mar. 2007).

IBMTransarc[Retrieved on Dec. 13, 2007], pp. 1-49, Retrieved from internet: URL: http://www-01.ibm.com/common/ssi/rep__ca/0/897/ENUS297-220/index.html.

*NFS: Network File System Protocol Specification*, [online] [Retrieved on Mar. 4, 2007] pp. 1-27, URL: http://tools.ietf.org/html/rfc1094, Sun MircoSystems, Inc., RFC 1094, Mar. 1989.

Braam, P.J., *The Coda Distributed File System*, pp. 46-51, Linux Journal, Jun. 1998.

*List of File System* [online] Retrieved on Dec. 11, 2007] pp. 1-8. Retrieved from Wikipedia internet URL: http://en.wikipedia.org/wiki/List__of__file__systems.

Merrells, et al., *LDAP Replication Architecture*, IETF Draft Document, Mar. 2, 2000, pp. 1-95 (Aug. 31, 2007 filing).

*Overview of the Distributed File System Solution in Microsoft Windows Server 2003 R2*, [online]. [Retrieved on Jul. 20, 2006] pp. 1-15. Retrieved from internet: URL; http://technet2.microsoft.com/WindowsServer/en/library/d3afe6ee-3083-4950-a093-8ab74.html.

Guy, Richard et al., *Rumor: Mobile Data Access Through Optimistic Peer-to-Peer Replication*, University of California, LA, USA, pp. 1-12.. [Retrieved from internet: URL: http://fmg-www.cs.ucla.edu/rumor98/replication.html].

Barreto, J. and Ferreira, Paulo, *A Replicated File System For Resource Constrained Mobile Degvices*, INESC-ID/IST, Rua Alves Redol No. 9, 1000-029 Lisboa, Portugal.

Bjorn, Gronvall, Westerlund, Asssar,and Pink, Stephen, *The Design of a Multicast-based Distributed File System, Swedish Institute of Computer Science and Lulea University of Technology,* [online] . Retrieved from internet, URL: http://www.sics.se/cna/jetfile/osdi99.html].

Examination Report in European Patent Application No. EP-04102757.4-2211, Jul. 26, 2005, 8 pages.

Response to Examination Report (Jul. 26, 2005) in European Patent Application No. EP-04102757.4-2211, Feb. 6, 2006, 22 pages.

Examination Report in European Patent Application No. EP-04102757.4-2211, Jan. 21, 2008, 6 pages.

Examiner's Report in Australian Patent Application No. 2004202863 dated Aug. 27, 2009.

Minutes of Oral Proceedings for European Patent Application no. 041027574 dated Oct. 1, 2009.

Response to Summons for Oral Proceedings for European Patent Application No. 041027574 dated Sep. 1, 2009.

\* cited by examiner

FIG. 4

```
┌─ MACHINE 1 ─────────────────────────────────────────────┐
│                                                          │
│  A:X                                                     │
│                                                          │
│  Meta-data:                                              │
│       fence value = 1                                    │
│       clock = 4                                          │
│       GUID = { 0xfeef11f0-0x01fee-0x10da-0xdd11-0x0123456789ab }
│       version = 23                                       │
│       author = { 0xfee1fee1-0xfee1-x0fee1-0x0fee1-0xfeefaaf00f11 }
│       digest = 0x12324554                                │
│  Resource-data:                                          │
│       name = "A"                                         │
│       data = "X"                                         │
│       CreateTime = 21-Jun-03-08:43:21                    │
│       UpdateTime = 25-Jun-03-21:44:32                    │
│       ...                                                │
└──────────────────────────────────────────────────────────┘
```

FIG. 5
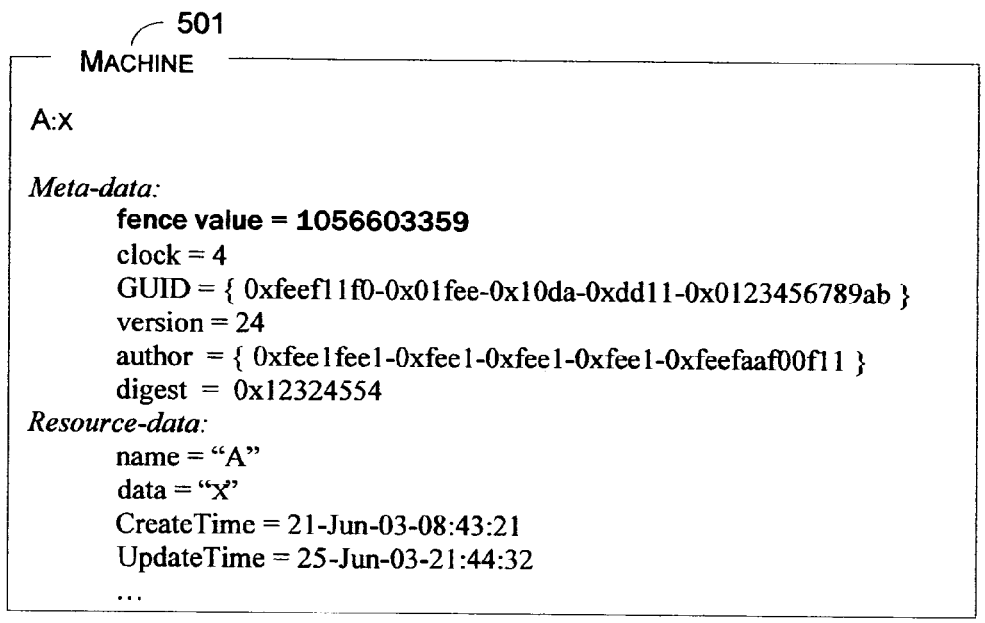
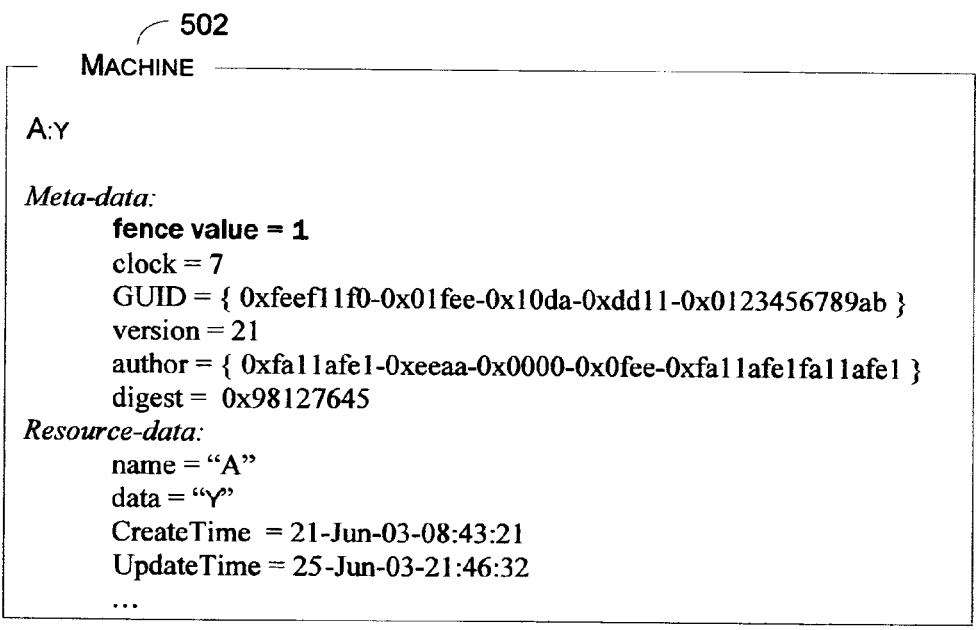

GRANULAR CONTROL OVER THE AUTHORITY OF REPLICATED INFORMATION VIA FENCING AND UNFENCING

CROSS-REFERENCE TO RELATED APPLICATION

This application claims the benefit of U.S. Provisional Application No. 60/486,627, filed Jul. 10, 2003, entitled GRANULAR CONTROL OVER THE AUTHORITY OF REPLICATED INFORMATION VIA FENCING AND UNFENCING, which application is incorporated herein in its entirety.

FIELD OF THE INVENTION

The present invention relates generally to computing devices, and more particularly to resource replication systems.

BACKGROUND

Opportunistic, multi-master replication systems allow unrestricted changes to replicated content on any machine participating in a given replica set. These potentially conflicting changes are reconciled under the control of the replication system using a set of conflict resolution criteria that defines, for every conflict situation, which conflicting change takes precedence over others. In the past, the main conflict resolution criteria used has been the physical or logical time of the change, with the most recent change taking precedence over all the others.

However, a number of cases exist where users or applications may wish to have additional ways of controlling which concurrent update gets precedence over the others and conversely which updates should yield precedence. What is needed is a flexible method and system for controlling which content gets precedence and is replicated.

SUMMARY

Briefly, the present invention provides a method and system for controlling which content gets precedence and is replicated. A replica set is comprised of a set of resources. Each resource is associated with resource data and resource meta-data. Resource data, for the case of files, includes file contents and attributes, while resource meta-data includes additional attributes that are relevant for negotiating synchronization during replication. An extra field called a "fence value" is added to the meta-data associated with each resource. During synchronization, fence values are compared. The resource with the highest fence value includes the content that is controlling and gets replicated. If fence values are equal (and greater than a particular value), the controlling resource is determined based on other meta-data.

Fence values are independent of local changes to content. That is, while a local change in content may affect other meta-data (e.g., a time stamp, clock value, or otherwise), the local change in content does not affect a fence value unless otherwise indicated.

In one aspect of the invention, a resource may have a fence value that indicates that the resource is unfenced. If a resource is unfenced, this indicates that the resource should not be transmitted from the machine upon which the resource is stored. When a contending resource is received for synchronization, a resource that is unfenced loses (and is replaced during synchronization) to resources that are fenced.

In another aspect of the invention, only differences between resources on a machine with a winning resource and a machine with losing content are transmitted. For example, resource meta-data may be transmitted without transmitting resource content. As another example, differences in resource content may be transmitted during synchronization.

Other advantages will become apparent from the following detailed description when taken in conjunction with the drawings, in which:

BRIEF DESCRIPTION OF THE DRAWINGS

FIG. 4 shows some exemplary resource data and meta-data that could be used for a machine of FIGS. 2 and 3 in accordance with various aspects of the invention;

FIG. 5 shows some exemplary resource data and meta-data that may be used in accordance with various aspects of the invention;

DETAILED DESCRIPTION

Exemplary Operating Environment

Figure 1:
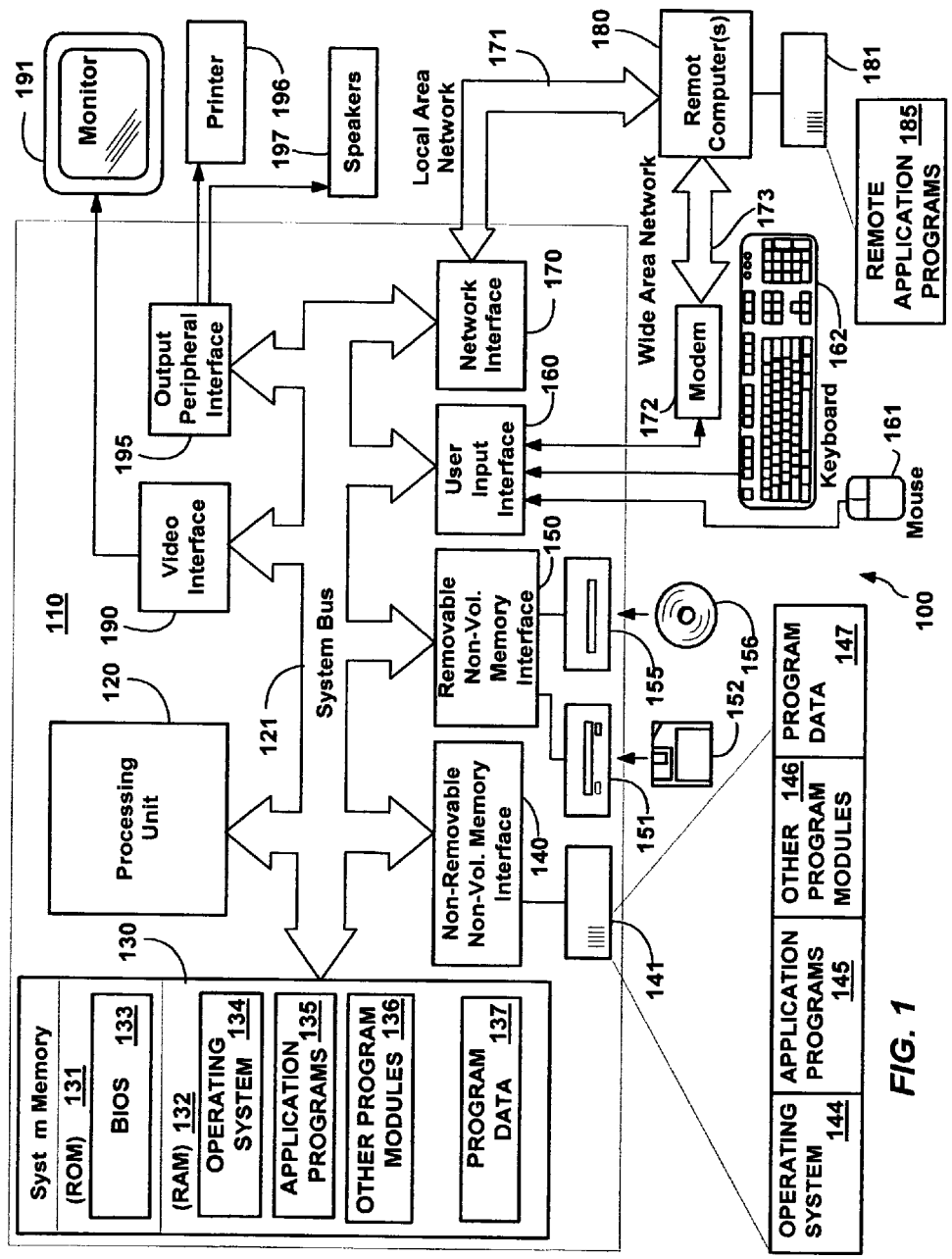
FIG. 1 is a block diagram representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Controlling Updates with Resource Replication

Figure 2:
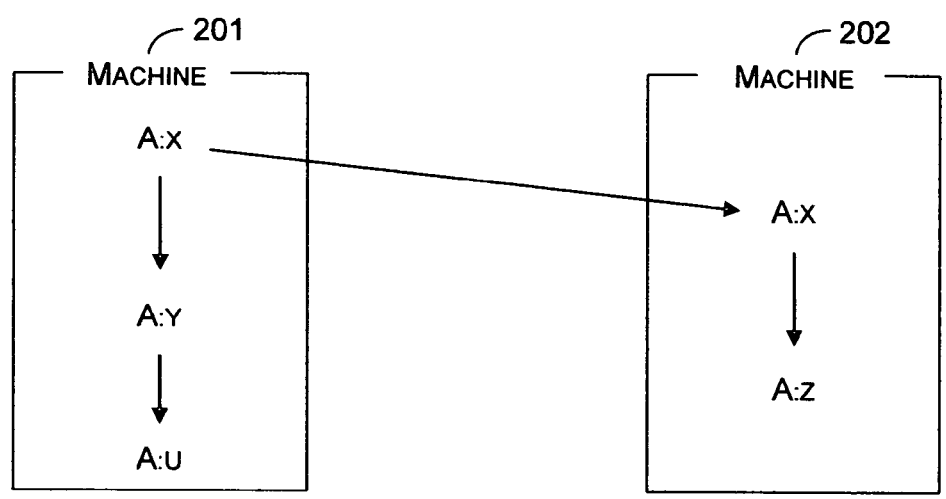
FIG. 2 is a block diagram representing a resource replication system including two machines that replicate resources in accordance with various aspects of the invention.

FIG. 2 is a block diagram representing a resource replication system including two machines that replicate resources in accordance with various aspects of the invention. Machines 201 and 202 both replicate resource A and update it concurrently from having content x to having content y, u, or z. Content x, y, u, and z may correspond, for example, to different version sequence numbers and clocks for resource A.

The term "machine" is not limited simply to a physical machine. Rather, a single physical machine may include multiple virtual machines. Replication from one machine to another machine, as used herein, implies replication of one or more members of the same replica set from one machine, virtual or physical, to another machine, virtual or physical. A single physical machine may include multiple members of the same replica set. Thus, replicating members of a replica set may involve synchronizing the members of a single physical machine that includes two or more members of the same replica set.

A replication system will typically maintain two related sets of data with each resource: resource data and resource meta-data. In replication systems including data stores based on named files in a file system, resource data may include file contents, as well as any file attributes that are stored on the file system in association with the file contents. File attributes may include access control lists (ACLs), creation/modification times, and other data associated with a file. In replication systems including data stores not based on named files in a file system (e.g., ones in which resources are stored in a database or object-based data store), resource data appropriate to the data store is stored. Throughout this document, replication systems based on files in a file system are often used for illustration, but it will be recognized that any data store capable of storing content may be used without departing from the spirit or scope of the present invention.

Resource meta-data comprises a set of additional attributes that are relevant for negotiating synchronization during replication. For each resource, resource meta-data may include a globally unique identifier (GUID), whether the resource has been deleted, a version sequence number together with authorship of a change, a clock value to reflect the time a change occurred, and other fields, such as a digest that summarizes values of resource data and may include signatures for resource content. A digest may be used for a quick comparison to bypass data-transfer during replication synchronization, for example. If a resource on a destination machine is synchronized with content on a source machine (e.g., as indicated by a digest), network overhead may be minimized by transmitting just the resource meta-data, without transmitting the resource data itself. Transmitting the resource meta-data is done so that the destination machine may reflect the meta-data included on the source machine in its subsequent replication activities. This may allow the destination machine, for example, to become a source machine in a subsequent replication activity. Resource meta-data may be stored with or separate from resource data with departing from the spirit or scope of the invention.

In general, in wide area distributed systems, it is not feasible to assume clock synchronization on a very granular level. This prevents replication systems from using a global clock to determine winners for concurrent updates and creates. Replicators typically use logical distributed clocks that are stamped on meta-data for distributed content. A logical clock is incremented when content is updated, as opposed to being overwritten by the physical local clock of the change time. Logical clocks thus respect causality: updates to the same content are stamped with ever increasing clock values. The clock value of A:x in FIG. 2 may, for instance, be four ("4"). The replication system then ensures that the clock values associated with A:y and A:z are larger than four. The relationship between those clock values is arbitrary. The values may or may not be identical, as they are assigned independently (e.g., machine 201 assigns the clock value for A:y while machine 202 assigns the clock value for A:z).

In normal replication synchronization, clock values may be used to determine a conflict winner based on a last-writer-wins conflict resolution strategy. Data with the highest clock value may indicate more recent data than replicated data with lesser clock values. The last-writer-wins strategy is consistent with logical clocks, as they preserve causality.

In accordance with an aspect of the present invention, resource meta-data is augmented with a numeric field called a "fence value." A fence value may be assigned to each resource or portion thereof. Fence values are used during conflict resolution, in conjunction with the other meta-data, according to a set of rules defined below.

In one embodiment of the invention, according to the rules, fence values are initialized to either zero or one. A zero value indicates that the resource should not be sent or made visible (via the replication mechanism) to another machine. A value of one indicates that the resource may be replicated and made visible to other machines. A resource that has a fence value of zero may be considered a slave resource while a resource that has a fence value of one may be considered a master resource.

If during a replication activity between two machines, a resource (e.g., resource A) on one of the machines (e.g., machine 201) has a higher fence value the same resource on another machine (e.g., machine 202), the resource having the higher fence value is replicated to the machine with the resource having the lower fence value. In other words, the resource with the higher fence value wins (and is replicated), regardless of what other resource meta-data is present.

In replicating a resource that already exists on two machines but is different, mechanisms may be utilized which attempt to propagate as little data as possible to synchronize the resource. For example, instead of sending all the data associated with a resource, the replication mechanism may determine what data in the resource on the sending machine is different from data in the resource on the receiving machine and send one or more differences or deltas to update the resource on the receiving machine.

If during a replication activity, the fence values are the same and are greater than zero, then which resource wins (and is replicated) depends on the other resource meta-data associated with each resource. In other words, when the fence values are the same, replication proceeds according to normal rules associated with replication.

Thus, fence values supply fine-grained control over the conflict resolution process, since they take precedence in conflict resolution. That is, when the meta-data of two resources is compared, the resource with the highest fence value takes precedence. Other attributes, such as logical clocks, are compared only when the fences are equal.

Fence values may have similar properties to logical clocks, as in one implementation they can only be incremented, or reset to zero. For example, a fence value may be incremented when a user or process instructs the replication system to do so. This is sometimes referred to as "fencing the resource" or simply "fencing." An increment to the fence value is independent of updates to the resource data. Fence increments are made visible (e.g., are transmitted in meta-data) by replication. Since fencing is not a frequent operation, an integer representation of the wall-clock time may be used to increment a fence to the maximum of (the current fence value plus one) and (the current wall-clock time).

A fence value may be reset to zero when a user or process instructs the replication system to do so. This is sometimes referred to as "unfencing the resource" or simply "unfencing." Slave mode resources that are unfenced (i.e., whose fence values have been reset to zero) may not be replicated to any other machine outside the machine that holds them. This prevents a slave-mode resource from becoming externally visible. Hence, fence value resets are not made visible by replication.

Except for fencing and unfencing, fence values remain constant during replication. In particular, a positive fence value does not change when the resource data is updated or when logical clocks change. Zero-valued fence values should also not change on content updates for slave machines.

It will be recognized that fencing a resource on one machine allows forcing the replication of said resource regardless of concurrent updates to the resource on other members of the replica set. It will also be recognized that unfencing a resource allows forcing any other replicated resource to take precedence over the local (unfenced) one and prevents the unfenced resource from replicating out.

Fences can be set on an existing resource via a replication system application programming interface (API) that fences selected resources. Furthermore, fences can be set on a future resources by exposing an API that fences resources matching specific parameters (such as resource names and attributes) when these resources become visible to the replication system. Control of future fencing and unfencing may also be provided by specifying stickiness: creation of indirectly related resources, such as resources under a fenced/unfenced directory may inherit the fencing value based on a policy set on the parent.

Unfencing also provides a granular way to control the master or slave behavior of replication partners. Setting a fence on selected resources effectively makes a machine a master of that version of the content (until the content is updated for the first time). Unfencing selected resources makes a machine behave as a slave with respect to the content associated with the selected resources.

It will be recognized that fencing and unfencing may be used in a number of areas including backup restore, out-of-band replication, upgrading to a newer version of the replicator, and providing administrator control.

A machine that includes an unfenced resource (e.g., with a fence value of zero), may choose to change the unfenced resource fence value to a fenced resource value (e.g., one) for a resource that is updated locally on the slave. This may be done, for example, to make the update visible.

Figure 3:
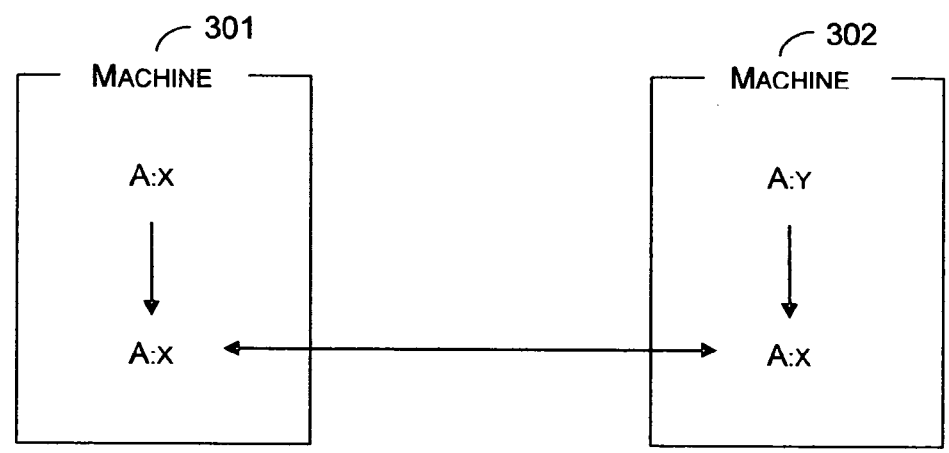
FIG. 3 is a block diagram representing a system in which two machines attempt to reconcile a resource included on both in accordance with various aspects of the invention.

FIG. 3 is a block diagram representing a system in which two machines attempt to reconcile a resource included on both in accordance with various aspects of the invention. In FIG. 3, each machine has its own version of the resource and the resource has the same name or identifier. At the end of the reconciliation, the goal is to have a replicated resource having either the content of x or y. In the system shown in FIG. 3, the content x of machine 301 wins over the content y of machine 302. This may occur, for example, if a fence value is higher for resource A on machine 301 or through comparison of other resource meta-data.

FIG. 4 shows some exemplary resource data and meta-data that could be used for A:x of FIGS. 2 and 3 in accordance with various aspects of the invention. The resource meta-data includes a fence value of 1, a clock value, a GUID, replica member that authored the change, and digest. The resource data includes a name of the resource, the data itself, a create time, a modify time, and other attributes of the resource data.

FIG. 5 shows some exemplary resource data and meta-data that may be used in accordance with various aspects of the invention, related to the synchronization shown in FIG. 3. The content on machine 501 (e.g., x) wins over the content on machine 502 (e.g., y) and would hence be replicated to machine 502 because the fence value for the resource associated with x (i.e., 1056603359) is larger than the fence value for the resource associated with y (i.e., 1). Note that under conventional replication methods, y would win over x because of a larger update clock time.

Figure 6:
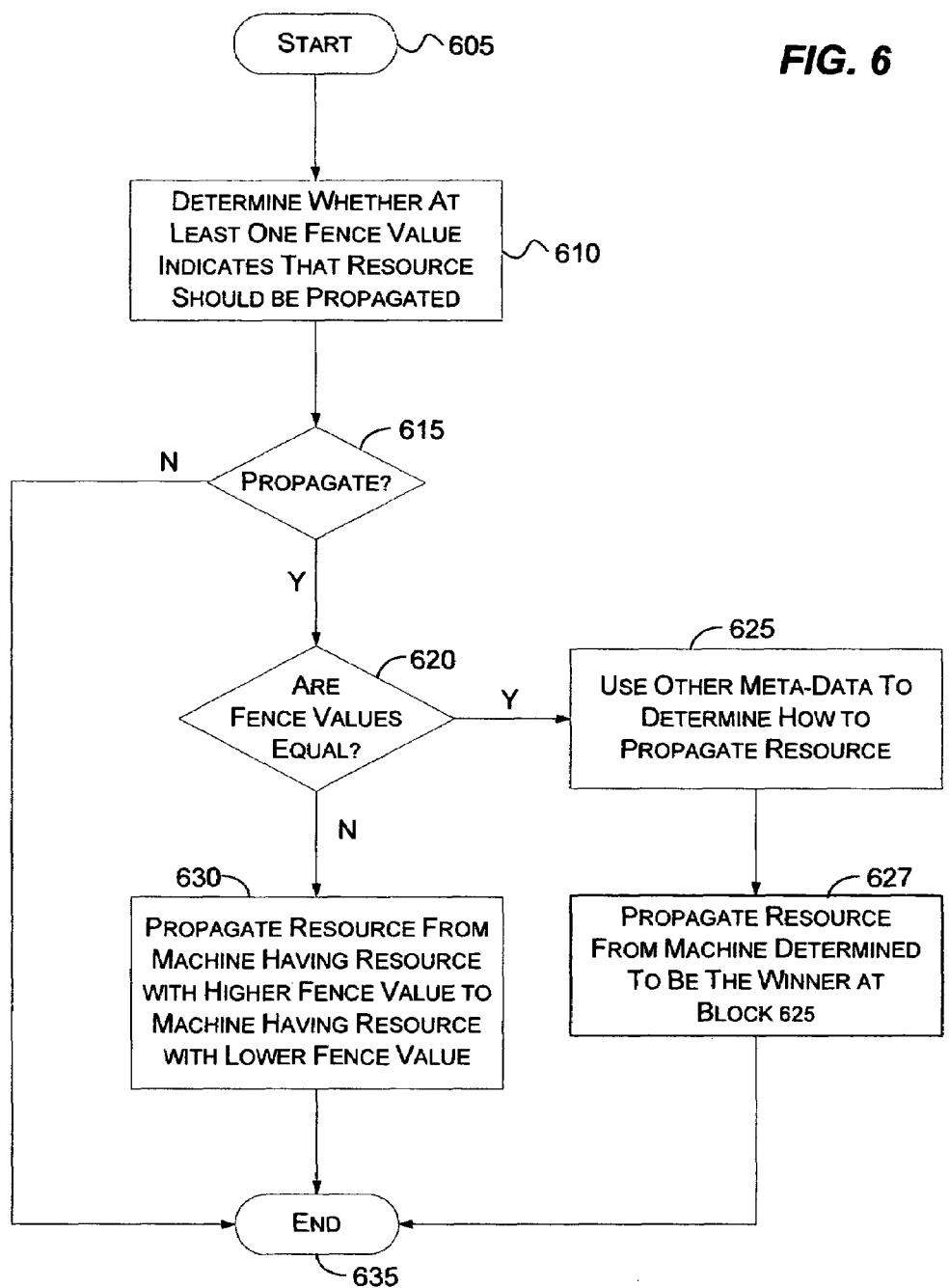
FIG. 6 is a dataflow diagram that generally represents exemplary steps that may occur to synchronize a resource between two machines in accordance with various aspects of the present invention.

FIG. 6 is a dataflow diagram that generally represents exemplary steps that may occur to synchronize a resource between two machines in accordance with various aspects of the present invention. The process begins at block 605.

At block 610, a determination as to whether at least one of the fence values indicates that the resource should be propagated. Both of the fence values may be set to an unfenced state (e.g., 0). In this case, the resource should not be propagated. If one of the fence values is set to a fenced value (e.g., 1 or greater), then the resource should be propagated if needed to synchronize the two resources.

At block 615 if the resource should be propagated, processing branches to block 620; otherwise processing branches to block 635. At block 620, a determination is made as to whether the fence values are equal. If so, processing branches to block 625 where other meta-data is used to determine how to propagate the resource. At block 627, the resource or a portion thereof (e.g., the meta-data, fence value, differences in content, and the like) are propagated from the machine that was determined at block 625.

If the fence values are not equal at block 620, processing branches to block 630. At block 630, the resource or a portion thereof (e.g., the meta-data, fence value, differences in content, and the like) are propagated from the machine having a higher fence value for the resource to the machine having the lower fence value for the resource. At block 635, processing ends.

The following are some example scenarios in which aspects of the present invention may be used.

Non-authoritative backup restore: when data becomes corrupted or is lost, a user managing a member of a replicated resource system may erase the member and ask to obtain all the data associated with the member via the resource replication system. When a member is relatively large in relation to the bandwidth of a link connecting the member to the resource replication system, this course of action may take too long or cost too much. Using an aspect of the invention, however, the user may restore resources of a member from a backup. The user may then unfence the resources in the backup (e.g., set the fence value at 0) and allow the resource replication system to update resources that are out of date. In this case, the restored content just acts as a "content cache" that given the appropriate logic may be used by the replicator to avoid transferring content over a slow link (e.g., "over the wire"), thus keeping the initial synchronization traffic following a backup restore restricted to meta-data and resource data that need to be updated. After synchronization, any remaining resources having a fence value of 0 may be deleted or may have their fence value set to 1 to allow them to replicate.

Out-of-band copying: new members of a replica set may potentially include a large amount of data. To facilitate faster and/or less expensive transfer, the new members may be sent through a channel that has lower cost and/or faster service for the user. For example, the new members may be copied to a hard disk or burned on CD-ROMs or DVD-ROMs and shipped overnight. Upon copying the new members to the system at the remote site, they may be unfenced as described above with respect to non-authoritative backup restore. Unfencing the new members is done to avoid transferring the content copied onto the remote site to other sites.

Authoritative backup restore: a user may wish to restore from a backup and propagate the restored content to all systems in the replicated resource system. To do so, the user may restore the resources to a system and then fence the resources the user wishes to propagate.

Ad hoc scenarios: a user may desire to force a specific version of a set of resources to replicate and take precedence over any other conflicting content in a replica set. This may be done by fencing the set of resources.

Initial synchronization: Initial synchronization is a special case of out-of-band copying. In setting up or upgrading a replicated system, a user may designate one machine as a master (i.e., to contain content that is to be replicated to the other machines) and designate the other machines as slaves (i.e., to receive the content from the master). To do so, the user may fence the resource on the master to have an initial fence value of 1 and unfence the existing resources on the slaves with a fence value of 0. A resource that comes into existence on a slave after this initialization may be fenced with 1 so that it will be replicated. Since an unfenced slave resource is not replicated, it is not necessary to synchronize additional meta-data for such a resource when it loses against a name-conflicting resource from the master.

Figure 7:
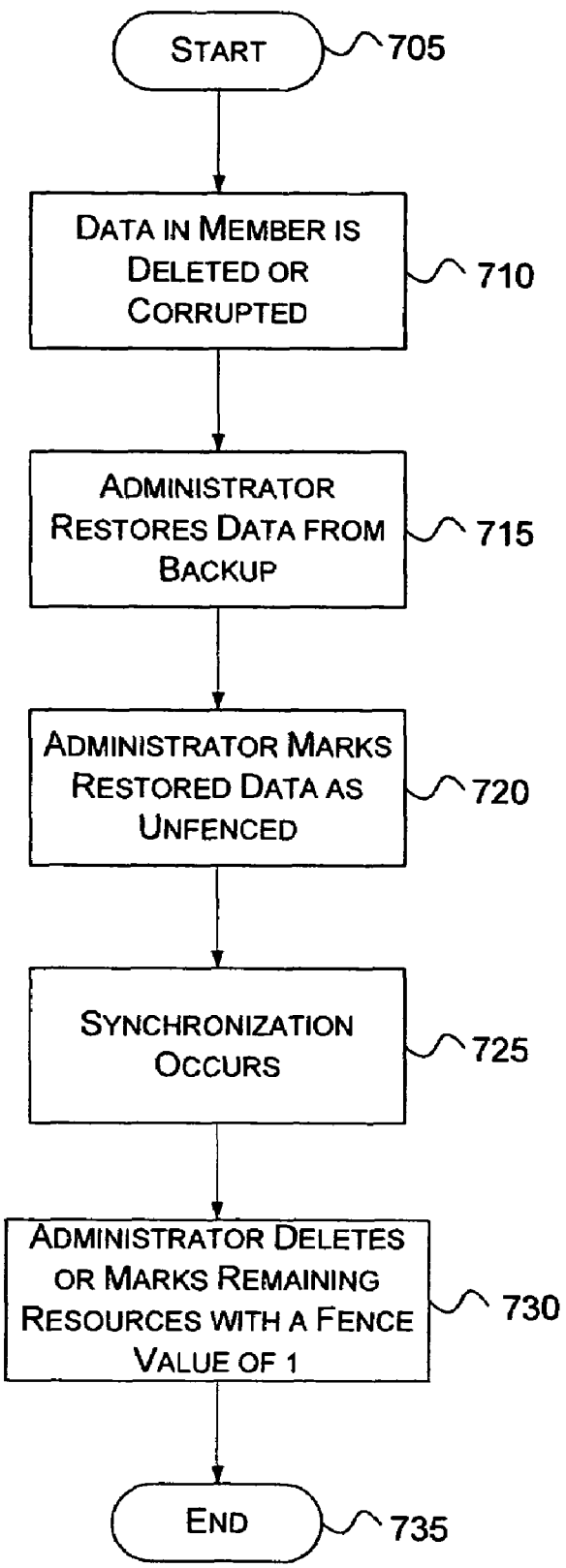
FIG. 7 is a dataflow diagram that generally represents exemplary steps that may occur to perform a non-authoritative backup in accordance with various aspects of the invention.

FIG. 7 is a dataflow diagram that generally represents exemplary steps that may occur to perform a non-authoritative backup restore in accordance with various aspects of the invention. Data in a member is deleted or corrupted (block 710). The administrator restores from a backup (block 715). The administrator marks the restored data as unfenced (block 720). Synchronization occurs, as represented at block 725. The administrator deletes or marks the remaining resources with a fence value of 1 (block 730), and the process ends (block 735).

FIG. 7 is provided as one example for steps that may occur in the non-authoritative backup describe above. It will be recognized that the other applications mentioned above have also been described in enough detail to easily reduce to dataflow diagrams. It will also be understood that many other variations may be made to the steps of FIG. 7 or the applications described above without departing from the spirit or scope of the present invention.

Figure 8:
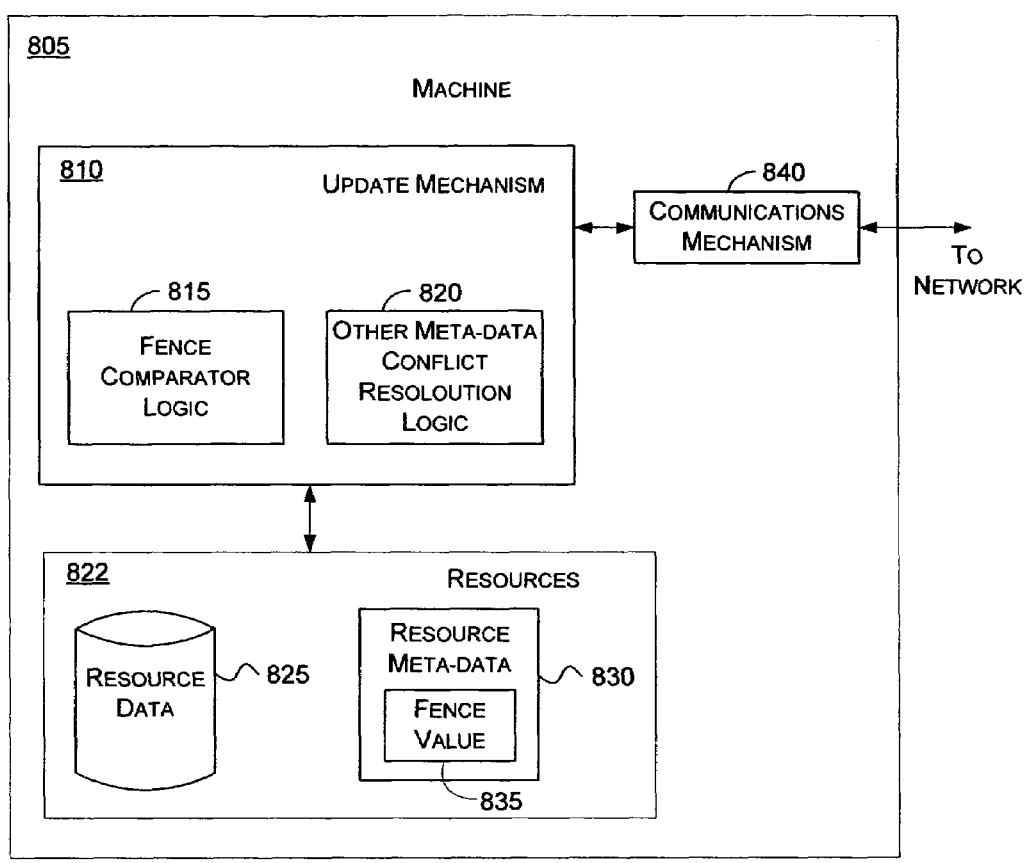
FIG. 8 is a block diagram representing an example machine configured to operate in a resource replication system in accordance with various aspects of the invention.

FIG. 8 is a block diagram representing a machine configured to operate in a resource replication system in accordance with various aspects of the invention. The machine 805 includes an update mechanism 810, resources 822, and a communications mechanism 840.

The update mechanism 810 includes fence comparator logic 815 that is used to compare fence values and determine whether resources should be propagated from the machine 805 or whether the resources should even be visible to other machines. The fence comparator logic 815 may also be used to determine how fence values should be updated in the event of a fencing operation or the corruption or deletion and subsequent rebuilding of resource meta-data 830 (as described in further detail below).

The other meta-data conflict resolution logic 820 includes logic used to determine which resource wins (and should be propagated) should the fence values for the resources be equivalent. In applying the other meta-data conflict resolution logic 820, the update mechanism 810 may access data in the resource meta-data 830 and/or the resource data 825 to determine whether a resource (or a portion thereof) should be propagated to or received from another machine.

The resources 822 include the resource data 825 and the resource meta-data 830. The distinction between resource data and resource meta-data was described above with reference to FIG. 2. Although shown in the same box, the resource data 825 may be stored in a separate store relative to the resource meta-data 830.

The communications mechanism 840 allows the update mechanism 810 to communicate with other update mechanisms (not shown) on other machines. Together, the update mechanisms determine which resources should be synchronized and how the synchronization may occur. The communications mechanism 840 may be a network interface or adapter 170, modem 172, or any other means for establishing communications as described in conjunction with FIG. 1.

It will be recognized that other variations of the machine shown in FIG. 8 may be implemented without departing from the spirit or scope of the invention.

In one embodiment of the invention, there are three initial fence values: −1, 0, and 1. The −1 takes the role of 0 above (i.e., the unfenced value) and 0 may indicate that the resource may replicate as long as there is no other resource with a fence value that is 1 or higher. A utility of this extension is in handling the loss of the replication meta-data. For example, a resource replicator may keep the meta-data in a store separate from the store used to store the resource data. Thus the meta-data and the resource data (i.e., the content) may fail independently. During a rebuild, a machine that has lost its meta-data may fence its resource with a value of −1 initially, as it does not know whether that resource was already replicated or just created locally (and therefore not known to the other machines in the replica set). Prematurely changing the fence value from −1 to 1 could have the effect of re-introducing stale content back into the network as content from more up to date but disconnected machines may be overwritten. Changing the fence from −1 to 0, on the other hand, may allow such content to be re-introduced up until the point where some other participant may determine that it is stale. Note that 0, 1 and 2 (or some other numbering scheme) may be used instead if only positive integers are desired shifting each value described above.

Yet another embodiment of this invention uses −∞ and 0 as possible initial fence values. In functionality, the fence value of −∞ replaces the 0 (i.e., is the unfenced value) while the 0 replaces the 1 (i.e., indicates that the resource should be replicated). In addition other negative fence values (e.g., −1, −2, −3, . . . , −n) may be used to indicate resources that may be replicated. Such fence values would lose against resources fenced with higher values. A utility of this generalization includes scenarios where availability of fresh resources is more important than bandwidth usage during a restore. Machines may each be assigned a different fence value (e.g, −1, −2, . . . , −n) that is used on the initial resources. The ordering gives precedence to a leader machine using fence −1, yet non-conflicting content from all machines is immediately available.

Another application of this representation includes decrementing fence values each time a machine recovers or rebuilds its meta-data in response to corruption or loss of the meta-data. A heuristic value of this application is that each time the machine rebuilds its meta-data, it is likely that the resource data stored on the machine is becoming less and less reliable and/or up-to-date. Through this mechanism, content on machines that rebuild their meta-data less frequently is considered more reliable and wins via fence values over content on machines that rebuild their meta-data more frequently.

It will be recognized that the fence values described above are logical fence values that may be implemented in any variety of physical fence values. For example, the fence values may be physically represented as unsigned integers, floating point numbers, bit values, or any other type of numbering scheme without departing from the spirit or scope of the invention.

As can be seen from the foregoing detailed description, there is provided an improved method and system for granular control over replicating information. While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A computer storage media storing computer-executable instructions that when executed perform a method comprising:
   receiving a first fence value and first meta-data of the first member of a replica set, wherein the first fence value is independent of any change made to content of the first member of the replica set and is used to resolve a conflict between information in the first member of the replica set and information in the second member of the replica set;
   comparing the first fence value with a second fence value of a second member of the replica set;
   determining whether the first fence value has precedence over the second fence value;
   based on the determining, changing content of the second member to reflect content of the first member; and
   changing second meta-data of the second member to indicate a change in the content of the second member and maintaining the second fence value unchanged, wherein the second fence value is independent of any change made to the content of the second member.

2. The computer storage media of claim 1, wherein the second fence value and the second meta-data is stored in a store separate from the content of the second member.

3. The computer storage media of claim 1, wherein changing content of the second member comprises determining one or more differences between content on the first member and the content of the second member.

4. The computer storage media of claim 1, wherein the content on the second machine comprises file data and file attributes.

5. The computer storage media of claim 1, wherein the first meta-data further comprises a first digest that summarizes the first resource and the second meta-data further comprises a second digest that summarizes the second resource.

6. The computer storage media of claim 5, further comprising comparing the first digest with the second digest and bypassing the changing the content of the second member if the first digest and the second digest are equivalent.

7. The computer storage media of claim 1, further comprising if the first fence value is equal to the second fence value, comparing the first meta-data with the second meta-data to determine whether the content on the second member should be changed.

8. The computer storage media of claim 1, wherein each of the first fence value and the second fence value is assigned to a portion of content on its respective member of the replica set.

9. A computer storage media storing computer-executable instructions that when executed perform a method comprising:
   determining whether a first resource residing on a first machine should be used to update a second resource residing on a second machine, each resource associated with a fence value, meta-data, and content, each meta-data including one or more fields that are updated whenever the content of the associated resource is changed and, each fence value indicating whether its associated resource should be used to update a resource on another machine, the fence value having precedence over the meta-data, wherein each fence value is independent of any change made to content of its associated resource and is used to resolve a conflict between information on the first machine and information on the second machine;
   preventing propagation from the second machine based on the fence value of the second resource indicating that the second resource should not be propagated; and
   updating the second resource from the first resource based on the fence value of the first resource having precedence over the fence value of the second resource, and maintaining the fence value of the first resource and the fence value of the second resource unchanged.

10. The computer storage media of claim 9, further comprising if the fence values of the first and second resources are equivalent, determining which machine will be updated based on the meta-data.

11. The computer storage media of claim 10, wherein the meta-data comprises a logical clock indicating the last time the corresponding content was updated.

12. The computer storage media of claim 11, wherein a fence value indicates that its corresponding resource may be propagated to other machines until another resource with a higher fence value is located on another machine.

13. The computer storage media of claim 9, wherein the meta-data associated with the first resource is stored in a separate data structure from its corresponding resource.

14. The computer storage media of claim 13, wherein the data structure is corrupted or deleted, further comprising rebuilding the data structure and decrementing the fence value associated with the first resource.

15. The computer storage media of claim 14, further comprising rebuilding the data structure a plurality of times and decrementing the fence value associated with the first resource each time the data structure is rebuilt.

16. The computer storage media of claim 15, further comprising if the fence value of the second resource has precedence over the fence value of the first resource, updating the first resource from the second resource.

17. A system for replicating data, comprising:
   a first machine having a first set of resources;
   a second machine having a second set of resources, wherein each resource on each machine is associated with a fence value, meta-data, and content, each meta-data including one or more fields that are updated whenever the content of the associated resource is changed and, each fence value indicating whether its associated resource should be used to update a resource on another machine independently from other meta-data and each fence value being independent of any change made to content of its associated resource and being used to resolve a conflict between information on the first machine and information on the second machine, wherein the first and second machines are configured to:

communicate information regarding the resources contained by both machines; and update each resource that is out-of-date according to the following precedence:

determining whether a fence value of a resource on one of the machines has precedence over the fence value of a corresponding resource on the other machine;

if a fence value of a resource on one of the machines has precedence over the fence value of a corresponding resource on the other machine, updating the other machine with the resource on the one machine; otherwise updating the resource on the machines based on data other than the fence values, wherein the fence values are maintained unchanged.

18. The system of claim 17, wherein the first set of resources is loaded from a backup and the fence values thereof are set to cause the first set of resources to have precedence over any other set of resources, such that any other set of resources on any other machine that corresponds to the set of resources are updated from the first set of resources.

19. The system of claim 17, wherein the fence values of the first set of resources are marked to have precedence over corresponding resources on other machines, such that the corresponding resources are updated from the first set of resources.

20. A computer implemented method of replicating data, the method comprising:

receiving a first fence value and first meta-data of a first member of a replica set, wherein the first fence value is independent of any change made to content of the first member of the replica set and is used to resolve a conflict between information on the first machine and information on the second machine;

comparing the first fence value with a second fence value of a second member of the replica set;

determining whether the first fence value has precedence over the second fence value;

based on the determining, changing content of the second member to reflect content of the first member; and changing second meta-data of the second member of the replica set to indicate a change in the content of the second member and maintaining the second fence value unchanged, wherein the second fence value is independent of any change made to the content of the second member.

21. The method of claim 20, wherein the second meta data is stored in a store separate from the content of the second member.

22. The method of claim 20, wherein changing the content of the second member comprises determining one or more differences between content on the first member and the content of the second member.

23. The method of claim 22, wherein content on the first machine and the content on the second machine is the same.

24. The method of claim 20, wherein the content on the second machine comprises file data and file attributes.

25. The method of claim 20, wherein the first meta-data comprises a digest that summarizes the first resource and the second meta-data comprises a second digest that summarizes the second resource.

26. The method of claim 25, further comprising comparing the first digest and the second digest and bypassing the changing the content of the second member if the digests are equivalent.

27. The method of claim 20, further comprising if the first fence value is equal to the second fence value, comparing the first meta-data with the second other meta-data to determine whether the content on the second machine should be changed.

28. The method of claim 20, wherein each of the first fence value and the second fence value is assigned to a portion of its respective member of the replica set.

* * * * *